United States Patent Office 3,600,168
Patented Aug. 17, 1971

3,600,168
LIGHT SENSITIVE REPRODUCTION SHEET AND METHOD AND COATING COMPOSITION THEREFOR USING FREE RADICALS
William R. Lawton, Salem, N.H., assignor to
Bard Laboratories, Inc., Amherst, N.H.
No Drawing. Filed Nov. 15, 1966, Ser. No. 594,375
Int. Cl. G03g 5/02
U.S. Cl. 96—89
27 Claims

ABSTRACT OF THE DISCLOSURE

Light sensitive copy sheet employing a light sensitive composition comprising an organic colored stable free radical and a precursor sensitive to light to be converted to transient free radicals reactive with the stable free radical to bleach out the color thereof and thereby form an image.

---

This invention is concerned with new light sensitive graphic reproduction systems.

One objective is the development of a reproduction system which is sensitive to ultraviolet, visible, and infrared light radiation.

A second objective is the development of a very economical office copy reproduction copy paper and a coating composition therefor.

A third objective is the development of a light sensitive copy paper which has good pre-exposure shelf stability and a coating composition therefor.

Another objective is the development of a light sensitive office copy process wherein the copy can be desensitized after exposure to a graphic original.

A further objective is the development of an ultraviolet sensitive copy process which can be used on commercial diazo copy machines without the need for a translucent or propietary original.

Another objective is the development of a copying process which can be used on a thermographic copying machine such as the "Thermofax" machine without requiring the use of a brittle translucent or tissue paper.

A further objective of this invention is the development of an infra-red copy sheet for use on "Thermofax" type of equipment which has true photographic resolution and which is not "color blind" and will copy all colors.

Still another objective is the development of a light sensitive reproduction process which can copy by direct or projection exposure using a visible light source.

The accomplishment of these and other objectives of the invention will be explained in the following disclosure.

This invention is based on the use of highly colored organic stable free radicals in combination with precursors which are sensitive to light to form transient free radicals. Preferably the stable free radicals and precursors are also combined with promotors to accelerate the formation of such transient free radicals but the promoters are not essential. These precursors will be referred to hereinafter as light sensitive free radical precursors. The stable free radicals form a highly colored sheet when coated on paper, film, foil, or other suitable carrier web. The light sensitive free radical precursors when combined in the coating with the stable free radicals generate transient free radicals in the light struck areas during the copying process. The transient free radicals react with the highly colored stable free radicals causing the color to bleach out in the light struck areas and leaving in the non-light struck areas a highly colored stable free radical image. Promoters may be used which will increase the sensitivity of the copy paper. The process can be used so that the photochemistry can be contained in the copy paper and copies can be made directly on commercial light exposing copying machines without the use of additional chemicals or vapors. Alternately, the photochemistry can be contained in the office copy machine and ordinary paper can be used in the copying process.

By a free radical we mean a fragment of a molecule which has an unpaired electron. A free radical has a high chemical reactivity which is connected with the tendency to compensate the spin of the free electron as well as the specific magnetic properties which are connected with this spin. Consequently, most free radicals are highly unstable and have a transitory existence. However, this invention relates to a known class of colored stable free radicals which are stable because the unpaired electron is shielded by a bulky molecule configuration to thereby provide steric hindrance. These stable free radicals are described as a class on pages 514 to 520 of "Organic Chemistry," 2nd ed., 1964 by Cram and Hammond published by McGraw-Hill Book Company. They are also described as a class in the book "Stable Radicals" by Anatolii Leonidovich Buchachenko published by Consultants Bureau, New York in 1965 and are also described as a class in C & EN, Oct. 3, 1966, pages 102 and 103. They may be defined as free radicals which are sufficiently stable to be isolated and stored and handled as such. However, the present invention takes advantage of the fact that when these stable free radicals are exposed to highly reactive transient free radicals they react quite readily since the transient free radicals are small enough to reach the unpaired electron of the stable free radical. Thus, in this invention, we take advantage of this chemical reactivity by trapping the transient free radicals, generated with light, with the highly colored stable free radical. The two free radical species interact to form one or more new components resulting in the discharge in the color (bleaching) of the highly colored stable free radical. The light generated free radical species exists only for a fraction of a second to a few seconds. The stable free radicals, on the other hand, exist for long periods of time and their life time can be measured in years. The transient free radicals are described as a class in Organic Chemistry, 2nd ed., 1964 by Cram & Hammond published by McGraw-Hill Book Company on pages 516–517 (see page 517 for transient free radicals which are formed by light exposure). They may be defined as short-lived free radicals which cannot be isolated or stored.

There are a considerable number of stable free radicals known at present, all of which are colored and all of which can be used in the present invention. However, preferred classes of stable free radicals are (1) the organic hydrazyls, in which the unpaired electron is on the nitrogen, (2) the organic verdazyls in which the unpaired electron is again on the nitrogen, (3) pyridinyl compounds, such as 1-ethyl-4-carbomethoxypyridinyl, in which the unpaired electron is again on the nitrogen, (4) the organic nitroxides in which the unpaired electron is on the oxygen, (5) the organic aroxyls, in which the unpaired electron is also on the oxygen, (6) the carbon free radicals in which the unpaired electron is on the carbon atom, particularly arylalkyls and aryl cycloalkyls in which the unpaired electron is on a carbon atom in the alkyl or cycloalkyl group and (7) ionic free radicals, particularly (a) Wurster's radicals (see C & E News, Oct. 3, 1966, pp. 102–103), (b) Weitz's radicals (see C & E News, Oct. 3, 1966, pp. 102–103), (c) semiquinones, (d) salts, such as amino phospheno, arseno, caesium, etc., of tetracyanoquinonedimethane, dicyanoquinonedimethane, tetracyanonaphthoquinonedimethane and dicyanonaphthoquinonedimethane, unsubstituted and substituted by halogens and nitro groups in the aromatic ring, (e) polynuclear aromatic and heterocyclic compounds reacted with an alkali metal to form an ion radical, these reactions being well known ones, (f) polynuclear aromatic and heterocyclic chlorates, (g) unsubstituted and N alkyl substituted carbazole-$C_7H_7^+BF_4^-$, (h) the triaryl nitrogen free radicals, such as the free radical ions of triaryl amines, e.g. the radical ion from tri-p-dimethylaminophenyl amine, and (i) hydrazinylium free radical ions, such as that formed by oxidizing polyaryl hydrazines, e.g. tetraphenylhydrazine, with the Gomberg reagent (silver perchlorate and iodine) (see C & E News, Oct. 3, 1966, pp. 102–103). Whereas the aforesaid classes 1 to 6 are non ionic, class 7 is ionic.

One of the most useful classes of colored stable free radicals are the hydrazyls and related nitrogen free radicals including the verdazyls and the pyridinyls. They can be readily prepared in a known manner and require only a very small amount to give an intense color from red to purple black according to the free radical. They act as efficient free radical scavengers, i.e. for the transient free radicals released from the precursors by light, and give a high contrast between the stable free radical image and the areas discharged or bleached by light. Representative stable free radicals of this class useful in the invention are included in the following list.

HYDRAZYLS

α-p-fluorophenyl-α-phenyl-β-picrylhydrazyl
α-p-chlorophenyl-α-phenyl-β-picrylhydrazyl
α-p-bromophenyl-α-phenyl-β-picrylhydrazyl
α-phenyl-α-biphenyl-β-picrylhydrazyl
α-(p-chlorobiphenyl)-α-phenyl-β-picrylhydrazyl
α-(p-bromobiphenyl)-α-phenyl-β-picrylhydrazyl
α,α-diphenyl-β-2,6-dinitrophenylhydrazyl
α-phenyl-α-fluoroenyl-β-picrylhydrazyl
α-(4-methoxyphenyl)-α-phenyl-β-picrylhydrazyl
α-(4-methoxybiphenyl)-α-phenyl-β-picrylhydrazyl
α,α-diphenyl-β-2,6-dinitro-4-sulfophenylhydrazyl
potassium salt α,α-diphenyl-β-2,6-dinitro-4-sulfophenylhydrazyl
α,α-diphenyl-β-2,6-dinitro-4-carboxyphenylhydrazyl
sodium salt α,α-diphenyl-β-2,6-dinitro-4-carboxyphenylhydrazyl
α-(α-naphthyl)-α-phenyl-β-picrylhydrazyl
α-(β-naphthyl)-α-phenyl-β-picrylhydrazyl
α,α-diphenyl-β-picryl-oxyhydrazyl
α,α-diphenyl-β-(2,4,6-trinitro-3-methylphenyl) hydrazyl
α-(α-naphthyl)-α-phenyl-β-(2,4,6-trinitro-3-methoxyphenyl)hydrazyl
α,α-diphenyl-β-picrylhydrazyl
potassium salt α,α-diphenyl-β-(2,4-dinitro-6-sulfophenyl) hydrazyl
α,α-diphenyl-β-(2,6-dinitro-4-bromophenyl) hydrazyl
2,2-bis(p-nitrophenyl)-1-picrylhydrazyl
N,N'-bis(α-(2-benzothiazolyl)-α-phenyl-β-3-picryl) hydrazinyl]piperazine
α-(N-methylbenzimidazol-2-yl)-α-phenyl-β-picrylhydrazyl
α,α-di(p-tolyl)-β-picrylhydrazyl
α,α-diphenyl-β-(2,4,6-trinitro-3-chlorophenyl) hydrazyl
α,α-2-diphenyl-β-(2,4,6-trinitro-3-piperidinophenyl) hydrazyl
α,α-diphenyl-β-(2,4,6-trinitro-3-morphdinophenyl) hydrazyl
α,α-diphenyl-β-(2,4,6-trinitro-3-methoxyphenyl) hydrazyl

VERDAZYLS (See Monatsh. Chem. 97 (2), 517–24 (1966)) also Chem. Abstracts 65–12277F; 60–11922g; 61–5624C; 62–7760F, Angew. Chem. 76 (15), 691 (1964).

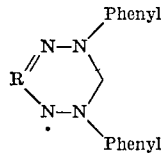

where R is a sugar radical such as p-galacto-pentaacetoxy pentyl, D-mannopentaacetoxypentyl, D-galacto-pentahydroxy pentyl,

PYRIDINYLS 1-ethyl-4-carbomethoxypyridinyl

A second class which contains many very stable free radicals ranging in color from yellow to purple is the nitroxides. Many of these can be chemically modified and have their physical properties changed without influencing the stable free radical character. Representative compounds of this class useful in the invention are as follows:

NITROXIDES 2,2,6,6-tetramethyl-N-dehydropiperidine-4-one-1-oxide
2,2,6,6-tetramethyl-N-dehydropiperidine-4-one-1-oxide hydrazide
2,2,6,6-tetramethyl-N-dehydropiperidine-4-one-1-oxide oxime
2,2,6,6-tetramethyl-N-dehydropiperidine-4-one-1-oxide semicarbazone
2,2,6,6-tetramethyl-N-dehydropiperidine-4-one-1-oxide 2,4-dinitrophenyl
2,2,6,6-tetramethyl-N-dehydropiperidine-4-one-1-oxide hydrazone
2,2,6,6-tetramethylpentamethylene nitroxide
2,2,6,6-tetramethyl-4-ethyl-4-piperidinolnitrogen oxide
2,2,7,7-tetramethyl-5-homopiperazinonenitroxide
2,2,6,6-tetramethyl-4-hydroxy-1-piperidin-1-oxyl
2,2,6,6-tetramethyl-4-hydroxy-1-piperidin-1-oxyl toluene sulfonate
2,2,6,6-tetramethyl-4-hydroxy-1-piperidin-1-oxyl-3,5-dinitrobenzoate
2,2,6,6-tetramethyl-4-hydroxy-1-piperidin-1-oxyl phenylcarbamate
β-(phenylnitrogen oxide)-β-methylpentaine-Δ-one oxime-phenylether (Banfield and Kenyon's radical)
di-t.butylnitroxide
t.butyl-2,6-dimethoxyphenylnitroxide
4,4'-dimethoxydiphenylnitroxide
diphenyl nitroxide
bis(trifluoromethyl)nitroxide
4,4'-bis(2,2,6,6-tetramethyl piperidine nitrogen oxide
2,2,6,6-tetramethyl-4-bromo-1,2,5,6-tetrahydropyridin-1-oxyl
2,2,6,6-tetramethyl-4-chloro-1,2,5,6-tetrahydropyridin-1-oxyl
2,2,4,4-tetramethyl-1,2,3,4-tetrahydro-p-carboline-3-oxyl
2,2,5,5-tetramethyl-1-aza-4-cyclopentene-4-carboxamide-1-oxide
2,2,6,6-tetramethyl-1-aza-4-cyclohexanol-4-methyl-1-oxide
2,2,5,5-tetramethyl-1-aza-cyclopentene-1-oxide
2,2,5,5-tetramethyl-1-aza-3-cyclopentanol-1-oxide
2,2,5,5-tetramethyl-1-aza-3-cyclopentanene-1-oxide-3-oxime
4,5,5,4',5'-hexamethyl-2,2'-aza-1,1'-pyrroline-1,1'-dioxide
5,5:5',5'-dispirocyclohexyl-2,2'-azo-1,1'-pyrroline-1,1'-dioxide
3,5,5,3',5',5'-hexamethyl-2,2'-azo-1,1'-pyrroline-1,1'-dioxide
5,5,5',5'-tetramethyl-2,2'-azo-1,1'-pyrroline-1,1'-dioxide
Porphyrexide
Porphyrindin
Dichloroporphyrexin
2,4-diimino-1,3-diazospiro-(4,5)-1-decyl-1-oxide
4,4'-bis(2,2,6,6-tetramethylpiperidinenitrogen oxide)
2,4',6-trimethoxydiphenylnitroxide
N-phenyl-p-benzoquinoneimine-N-oxide
N-(p-chlorophenyl)-p-benzoquinoneimine-N-oxide
1,1-dimethyl-3-(N-p-tolyloximino) butyl-p-tolylnitroxide
1,1-dimethyl-3-(N-m-tolyloximino) butyl-p-tolylnitroxide
diphenylaminopicrylnitroxide
di-p-anisylnitroxide
Fremy's salt (nitrosyldisulfonate ion)
3-amino-2,2,5,5-tetramethyl-1-pyrrolidinyloxy
3-carbamoyl-2,2,5,5-tetramethyl-3-pyrrolin-1-yloxy 3-carbamoyl-2,2,5,5-tetramethyl-1-pyrrolidinyloxy
3-cyano-2,2,5,5-tetramethyl-3-pyrrolin-1-yloxy
3-cyano-2,2,5,5-tetramethyl-1-pyrrolidinyloxy
2,2,5,5-tetramethyl-3-oxo-1-pyrrolidinyloxy
4-methyl-2-spirocyclohexyl-3,4:3′,2′-tetrahydrofurano-1,2,3,4-tetrahydroquinoline-1-oxide
di-2,2,6,6-tetramethylpiperidin-1-oxyl-4-hexamethylene-dicarbamate
di-2,2,6,6-tetramethylpiperidin-1-oxyl-4-oxalate
di-2,2,6,6-tetramethylpiperidin-1-oxyl-4-succinate
di-2,2,6,6-tetramethylpiperidin-1-oxyl-4-adipate
di-2,2,6,6-tetramethylpiperidin-1-oxyl-4-pimelate
di-2,2,6,6-tetramethylpiperidin-1-oxyl-4-sebacate
di-2,2,6,6-tetramethylpiperidin-1-oxyl-4-terephthalate
N,N′-di-2,2,6,6-tetramethyl-4-piperidyl-1-oxylurea
tri-(2,2,6,6-tetramethyl piperidine-1-oxyl) trimesate
tri-(2,2,6,6-tetramethylpiperidine-1-oxyl) phosphite
2,2,2′,2′,6,6,6′,6′-octamethyl-4-dipiperidyl-1,1′-dioxyl
2,2,6,6-tetramethyl-4-hydroxypiperidine-1-oxylbenzoate
2,2,6,6-tetramethyl-4-hydroxypiperidine-1-acid phthalate
tetra-2,2,6,6-tetramethyl-4-hydroxypiperidine-1-orthosilicate ester
tetra-2,2,6,6-tetramethyl-4-hydroxypiperidine-1-pyromellitate
di-2,2,6,6-tetramethyl-4-hydroxypiperidine-1-phthalate
monoethyl-2,2,6,6-tetramethyl-1-oxylpiperidylidene-succinate
monomethyl-2,2,6,6-tetramethyl-1-oxylpiperidylidene succinic acid
dimethyl-2,2,6,6-tetramethyl-1-oxylpiperidylidene succinic acid
methyl-2,2,6,6-tetramethyl-1-oxylpiperidylidene succinic acid
ethyl-2,2,6,6-tetramethyl-1-oxylpiperidylidene succinic acid
monoethyl-2,2,6,6-tetramethyl-1-oxylpiperidylidene succinic acid
monomethyl-2,2,6,6-tetramethyl-1-oxylpiperidylidene succinic acid
6-inethoxy-4-methyl-2-spirocyclohexyl-3,4:3′,2′-tetra-furano-1,2,3,4-tetrahydroquinolin-1-oxyl
2,2′,4,4′,5,5′-hexaphenyl-1,1′-biimidazolyl
and the substituted phenyl homologs The colors of the Aroxyls vary from yellow orange to blue. Representative of this class useful in the invention are the following:

AROXYLS

Galvinoxyl
Bisgalvinoxyl
2,4,6-tri-t.butylphenoxyl
2,6-di-t.butyl-4-(3,5-di-t.butyl-4-cyclohexa-2,5-dienylidene amino) phenoxy
2,6,2′,6′-tetra-t.butyl-4,4′-(3,5-di-t.butyl-4-oxocyclo-hexa-2,5-dienylidene methyl) diphenoxy
2,4,6-triphenylphenoxyl
2,2-bis(3,5-di-t.butyl-4-phenoxyl) propane
2,2′-bis(3,5-di-t.butyl-4-phenoxyl) biphenylene
4,6-di-t.butyl-2-t.butyloxy phenoxyl
4-cyano-2,6-di-t.butylphenoxyl
2,6-di-t.butyl-4-methoxyphenoxyl
2,3,4-trichloronaphthoxyl
9-chloro-1-phenoxanthryl The colors of the carbon free radicals vary from yellow to red. Representative of this class useful in the invention are the following:

CARBON FREE RADICALS

α,γ-bisdiphenylene-β-phenylallyl
α,γ-bisdiphenylene-β-(p-isopropylphenyl) allyl
α,γ-bisdiphenylene-β-(p-isopropenylphenyl) allyl
perchlorodiphenylmethyl
triphenylmethyl
diphenylbiphenylmethyl
phenyldibiphenylmethyl
dimethoxytriphenylmethyl
4,4-polymethylene-bis-triphenyl methyl
pentaphenylcyclopentadienyl
perchlorophenylmethyl
o-ethoxyphenyldiphenylmethyl
9-phenylfluorenyl
diphenyl-β-naphthylmethyl
α-methoxydiphenylmethyl
dimesityl methyl
p,p′-triphenylene-bis(diphenylmethyl)
dioxadihydrocoeranthryl
α-naphthyldibiphenylmethyl
pentaphenylethyl
bis(2,5-di-t.butylphenyl) methyl
dibensofulvenylmethyl
perchloro-4-phenyldiphenylmethyl
perchloro-4,4′-diphenyldiphenylmethyl
perchlorotriphenyl methyl
perchloro-4-phenyltriphenyl methyl
perchloro-4,4′-diphenyltriphenyl methyl
perchloro-4,4′,4″-triphenyltriphenyl methyl The ion free radicals differ somewhat from the others in that the stability of many of these free radicals is dependent on pH since they are ionic. The colors are quite intense and cover the visible spectrum.

As aforesaid, they may be broken down into the classes (a), (b), (c), (d), (e), (f), (g), (h) and (i) referred to above.

Representative of the class (a) Wurster radicals are the following:

Wurster blue
Wurster red
Stable free radicals derived from N-diphenylmethylene-aniline by oxidation, e.g. with bromine
Stable free radicals derived from N,N,N′,N′-tetramethyl-diaminodurene by oxidation, e.g. with bromine Representative of the class (b) Weitz's radicals are the following:

violenes of the type $-X-(CH=CH)_n-X^{\oplus}$ such as the bipyrenes, e.g. tetramethyl and tetraphenyl bipyrene, and the thiobypyrenes such as tetraphenyl thiobypyrene diazoviolenes, such as those attained by reacting hydrazine with a heterocyclic quaternary ammonium salt, such as the quaternary ammonium salt of N-alkyl (methyl), 2-halo (or ether or thioether) pyridine and having the formula:

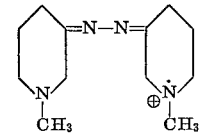

and also the compound:

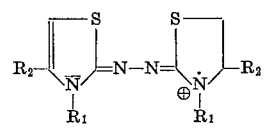

where $R_1$ is $CH_3$ or aryl and $R_2$ is $CH_3$ or hydrogen and also the compound:

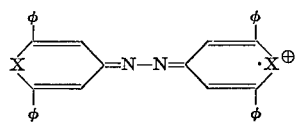

where X is $>N-CH_3$ or $>S$ and $\phi$ is phenyl.

Representative of the class (c) semiquinones are the following:

semiquinone semiquinone from Δ2,2' - biisobenzimidazolylidene by oxidation e.g. with bromine
quinoxaline semiquinone
chlorpromazine semiquinone
methylene blue semiquinones
Semiquinone from diphenoquinone - 4,4'-bis-dimethyl-immonium salt by oxidation, e.g. with bromine
Indomine semiquinones
indophenol semiquinones
p-benzosemiquinone
chloranil-N,N-dimethylaniline semiquinone
semiquinone from tetramethylbenzidine by oxidation, e.g. with bromine
camphor quinone semiquinones
1,6-diaminodurene-pyrene semiquinone radical ions
1,6 - diaminodurene - 2,3 - dichloro - 5,6 - dicyanobenzoquinone semiquinone radical ions
1,6-diaminodurene-bromanil semiquinone radical ions
1,6-diaminodurene-chloranil semiquinone radical ions
1,6-diaminodurene-iodanil semiquinone radical ions
pyocyanine quinhydrone Representative of the class (d) cyanoquinone dimethane and cyanonophthoquinonedimethane free radicals are the following:

tetracyanoquinodimethane (TCNQ)$^-$ $(C_2H_5)_3NH^+$

TCNQ$^-$ $(C_2H_5)_3NH^+$—TCNQ

TCNQ$^-$ Quinaldine$^+$—TCNQ

TCNQ$^-$ $(C_6HCl_3)$ $PCH_3^+$—TCNQ

TCNQ$^-$ $(C_6H_5)_3$ $AsCN^+$—TCNQ cesium tetracyanoquinodimethane

TCNQ. triphenylmethylphosphonium

TCNQ–tetramethyl-p-phenylene diamine

Amino, phospheno, arseno and cesium salts of 11, 11, 12, 12-tetracyanonaphtho-2, 6-quinodimethane Representative of the class (e) polynuclear aromatic and heterocyclic free radicals are the reaction products of alkali metal, i.e., sodium, potassium, lithium, cesium, with the following polynuclear aromatic and heterocyclic compounds:

thioxanthen-9-10,10-dioxide
9,10,di phenylanthracene
methylviologen
9,10-diethylanthracene
9-ethylanthracene
lumoflavine
acenaphthylene
1,4,5,8-tetraazananaphthalene
9-dicyanomethylene-2,4,7-trinitro fluorene
2,1,3-benzoxadiazole
9,10-diazaphenanthrene
perinaphthene
1,8-dinitronaphthalene
1,4,5,8-tetranitronaphthalene
pentacene Examples of the class (f) polynuclear aromatic and heterocyclic chlorate free radicals are as follows:

1-methyl-2-phenylindolizine monoperchlorate
1,2-dimethyl-3-indolizinium monochlorate Examples of the class (g) carbazole boron fluoride free radicals are as follows:

carbazole- $C_7H_7^+BF_4^-$
N-methylcarbazole —$C_7H_7^+BF_4^-$

In addition to the above classes of ionic free radicals, the following can also be used:

cation radical from tetra kis (dimethylamino) ethylene
1,2,4,5-tetramethylthiobenzene-Sb $Cl_5$
N,N'-dihydro-1,4-diazine cation stable free radicals derived from hexamethyl radialene
stable free radicals derived from hexaethylradialene
stable free radicals derived from diphenylacetylene
stable free radicals derived from dibenzocyclobutadiene
stable free radicals derived from cycloheptafluorene
stable free radicals derived from dodecamethylcyclohexasilane
stable free radicals derived from tetraphenylallyl
stable free radicals derived from 2,2'-bipyrimidine
stable free radicals derived from nitrobenzophenones
Koelsch's radical
stable free radicals derived from 3,3'-dinitrobenzil
Tanone
stable free radicals derived from trans stilbene
stable free radicals derived from ninhydrin
stable free radicals derived from alloxan The aforesaid stable free radicals may be complexed with other compounds as well known in the art. Complexing serves the purpose of stabilization to moisture or oxygen, or change to a more useful physical form, e.g. gas to solid, or changes color of the stable free radical, and, in some cases, its melting point.

Examples of classes of complexing compounds which can be used are inclusion complexing materials, e.g. urea, thiourea, gamma dextrin, and other well known inclusion complexing compounds, which form a channel or a cavity within which the stable free radical is trapped. The particular type of inclusion compound for any stable free radical depends on the molecular structure of the free radical. For example, urea will form complexes with straight chain aliphatic free radicals, thiourea forms complexes with branch chain aliphatic radicals and with alicyclic free radicals. The gamma dextrins, or the so-called Schardinger dextrins, form inclusion compounds with a variety of free radical structures. There are other well known inclusion complexing materials which will function in a similar manner.

A second class of complexing compounds are materials which form clathrate molecular complexes. Among the numerous classes of such complexing compounds are the bile acids, such as desoxy cholic acids, the flavans, the Werner complexes, hydroquinone, etc. These form a crystal cage completely surrounding the free radical.

A third class of complexing compounds are the charge transfer types. These include carbon disulfide, triphenyl phosphate, aromatic and nitro aromatic solvents, such as benzene, toluene, naphthalene, nitrobenzene, xylene, the ether solvents, such as dioxane, diethyl ether, and organic ester solvents, such as alkyl (e.g. ethyl) acetate, tetrachloro and tetrabromo phthalic acid esters and anhydrides and TCNQ, all of which form weak bonds with amines, amides, azo compounds and nitro aromatics and aliphatics.

A fourth class of complexing compounds are pi complexing compounds such as chloranil, bromanil, iodanil and other well known pi complexing compounds, which will form complexes with amines, aromatics, nitroaromatics and ethers, and all of which are kell known.

A fifth class of complexing compounds are hydrogen bonding molecular complexing compounds, such as the bisphenols and other aromatic hydroxy compounds, which form hydrogen bond complexes with the amides, the amines, hydrazines, hydrazides and which are well known.

The following complexes of the different types of stable free radicals can be used and have been reported in the literature:

α,α-diphenyl-β-picrylhydrazyl with benzene, carbon disulfide, toluene, nitrobenzene, dioxane, amyl acetate, and xylene.
picryl-N-amino carbazyl complexes with carbon disulfide and benzene
α,α-diphenyl-β-2,6-dinitro-4-carboxyphenylhydrazyl complexes with ether triphenylmethyl complexes with ethers, esters, ketones, and aldehydes
methylviologen radical complexes
gamma irradiated ketone radical complex as urea inclusion compounds
2,2,6,6-tetramethylpentamethyleneamine-N-oxide forms H-bond complexes with alcohols
semiquinone radical ions form molecular complexes
Wurster's blue perchlorate and N-ethylphenazyl form pi complexes
perhydrotriphenylene forms inclusion compounds with free radicals
2,4,6-triphenylphenoxyl forms complexes with benzenes, xylenes, and pyridine
tetramethyl thiobenzene cation radical forms a complex with SbCl5
dianisylazotoxy forms a pi complex with ethyl benzene
nitroxides form pi complexes with ethyl benzene.

The stable free radicals may also be stabilized by absorption on the oxides of silicon, aluminum, zinc, zirconium, tungsten.

The light sensitive free radical precursors useful in the present invention are those selected from the group consisting of:

(1) Nitroaliphatic compounds such as tetranitromethane, trinitromethane, hexanitroethane and t.butyl nitrite. The effectiveness of these materials is increased by the addition of organic unsaturated aliphatic and alicyclic compounds such as transcinnamic acid, transcinnamaldehyde, α-methylcinnamic acid, α-methylcinnamaldehyde, phorone, isophorone, acrylamide, methacrylamide, maleic acid.

(2) Para-tert-amino aromatic compounds such as p-dimethylaminobenzaldehyde, p - diethylaminobenzaldehyde, 4,4'-bis diethyl amino benzophenone, 4,4'-bisdimethylaminobenzophenone, 4,4'-bis dimethyl amino thiobenzophenone, 4,4'-bis diethylaminobenzophenone, N,N,N',N'-tetramethylbenzidine, N,N-diethyl-p-nitrosoaniline.

(3) Highly halogenated aliphatic, alicyclic and aromatic hydrocarbons such as carbon tetraiodide, carbon tetrabromide, carbon tetrachloride, iodoform, bromoform, chloroform, diiodo methane, dibromomethane, dichloromethane, hexachloroethane, benzotrichloride, p-nitrobenzotribromide, tetrachlorotetrahydronaphthalene, benzotribromide, pentabromoethane, tetrabromoethane, α,α-dichlorotoluene, 1,1 - dibromoethane, 1,1 - dichloroethane, 1,1,2-trichloroethane, polyvinylchloride-leuco base complexes, bromo trichloromethane, pentabromoethane, hexachlorocyclobutadiene, hexachlorocyclohexane.

(4) Quinones such as chloranil, benzoquinone, 2,5-di-t.butylbenzoquinone, 2,5-dichloro-3,6-dihydroxy benzoquinone, 2,5-diphenylbenzoquinone, 1,4-napthoquinone, 2,3-dichloro-1-naphthoquinone, 2 - methylanthraquinone, phenanthrenequinone, 1,2-naphthoquinone, tetrachloro-o-benzoquinone.

(5) Phototropic (having the property of reversibly changing color with different wave lengths of light) free radical precursors, which include:

(a) the anthrones and their homologues, such as anthrone, bianthrone, alkyl and phenyl substituted anthrone, bianthrone and benzylidene and anthrylidene substituted anthrone;

(b) tertiary amino triaryl methane, unsubstituted and in which the methane hydrogen is substituted by the cyano or hydroxyl group, such as 4,4',4'' diethyl amino triphenyl methane, 4,4',4'' diethyl amino triphenyl methane nitrile, dimethyl amino triphenyl carbinol, morphalino or piperidino triphenyl methane and dicyclohexyl amino triphenyl amine. The amino group may be on one or more of the aryl groups. The aryl groups can be all phenyl or may be all naphthyl or naphthyl phenyl. The amino nitrogen may be part of a heterocyclic ring, an alicyclic ring or have attached thereto alkyl or alicyclic groups;

(c) oxidized lophines such as 1,1'-biimidazolyl, and 2,2',4,4',5,5'-hexaphenyl - 1,1' - biimidazolyl unsubstituted or substituted in one or more of the phenyl rings with one or more of the groups alkyl, ether, hydroxyl, halogen and nitro;

(d) the anilides (known as Schiff bases) formed by reaction of aromatic aldehydes and aromatic amines, such as tetrachlorosalicyl anilide and 4-nitrosalicylanilide;

(e) aromatic ketones such as tetrachloroketodihydronaphthalene and phenylene-1-one.

(6) Azo compounds such as Diazald, azomethane, azobis (isobutyronitrile) called AZDN.

(7) Aromatic disulfides such as benzothiazyldisulfide.

(8) Organic silanes such as the triallyloxy-vinyl silane, dimethoxydiphenyl silane.

(9) Halo-amides and imides such as N-iodosuccinimide, N-bromosuccinimide, N-iodo succinimide, dichloroacetamide.

(10) The halogens, particularly iodine, when complexed in known manner to form a stable solid, such as iodine with pyrrolidone or vinyl pyrrolidone and its polymers and copolymers (one such complex is sold by General Aniline Company as PVP iodine).

(11) Organic N-nitroso compounds, such as Diazald, National Polychemical NP-1, NP-7.

(12) Aromatic sulphone hydrazides, such as benzene sulphon hydrozide and National Polychemical NP3 and NP4.

(13) Substituted pyrroles such as 2,3,4,5-tetraphenylpyrrole and 2,5-dimethyl-1-phenylpyrrole.

All of these classes of precursors are known for their property of being sensitive to light to form transient free radicals.

Certain of the free radical precursors can be complexed to reduce odor, toxicity, volatility, color and increase stability. Iodine forms many molecular complexes such as inclusion complexes (e.g. with urea, cellulose, starches, dextrins), pi complexes (e.g. with chloranil, bromanil), clatharate complexes (e.g. with bile acids, flavans, Werner complexes, hydroquinone, etc.) and charge transfer complexes (e.g. with amines, ethers, pyrrolidones, vinyl pyrrolidone and its polymers and copolymers, fused ring aromatics, such as anthracene, perylene, phenanthrene, etc.). These classes of complexes have been previously described. Iodoform can be complexed with sulfur, dithiane, stearoids, urea, cellulose, amines and aromatics to form inclusion or charge transfer complexes, as previously described. Carbon tetrachloride can be complexed with bile acids, steroids, aromatics, cellulose, and amines. These are just a few examples of the types of complexes which can be formed with many of the free radical precursors.

Promoters for the generation and reaction of the transient free radicals include: aromatic aldehydes such as anisaldehyde, 3,4 - diethoxybenzaldehyde, 1 - naphthaldehyde, benzaldehyde, p - nitrobenzaldehyde, o - methoxybenzaldehyde, p-tolualdehyde, 3-ethoxy-4-hydroxybenzaldehyde, 2,3-dimethoxybenzaldehyde, 2,4-dimethoxybenzaldehyde, 2,5-dimethoxybenzaldehyde, and 3,4,5-trimethoxybenzaldehyde. Ether substituted aromatic keto compounds, such as trimethoxy benzophenone, also act as promoters.

The compositions of the present invention, i.e. the mixture of stable free radicals and the precursor (and usually a binder and promoter), can be applied to a sheet or web, such as paper, metal foil, plastic film, etc., stored in a dark, light-proof container of known type and used with an infra red thermofax copier, a UV copier, such as a Bruning diazo copier or a visible light printer or projector. In such case, it is applied to the web as a liquid in a suitable carrier, dried and packaged under safe light conditions. The composition may also be stored and sold in liquid form in light-proof, dark containers of known type and added to the copying machines of the type utilizing liquids, in which the liquid is applied to the sheet in the machine at the time of use.

In either case, shortly after the image is made, excess precursor and/or promoter is removed by evaporation to render the composition insensitive to further light exposure. This can be easily done by subjecting the imaged sheet to heat, e.g. passage through the heating unit of a Bruning 110 machine. The temperature required depends on the volatility of the precursor and/or promoter. However, with most of the precursors and promoters used in the present invention, a temperature of between about 80° C. and 180° C. for a relatively short time is adequate. Where the composition is applied as a liquid in the machine, highly volatile precursors, such as the poly nitro methanes and diazo methane, and highly volatile promoters such as anisaldehyde, can be used which evaporate sufficiently fast so that little or no heat is required to stabilize the sheet.

Stabilization after imaging can be conveniently achieved, especially with dried coated sheets, by encapsulating in rupturable (preferably pressure-rupturable) micro capsules the stable free radical and highly volatile precursors and promoters (when a promoter is used), applying the micro capsules to the sheet with a binder as a dried coating and rupturing the capsules in the coating either immediately prior to, simultaneously with, or immediately after imaging the sheet to thereby permit the highly volatile carrier medium, precursors and promoters to escape by vaporization or by adsorption into the base sheet or web so that only the stable free radical exists, thereby rendering the sheet insensitive to further light exposure without the necessity of heating. The capsules can be conveniently ruptured by passing the sheet between pressure rollers.

In this manner, highly volatile (particularly precursors and promoters) or other difficult to handle materials can be encapsulated to conveniently allow the incorporation of such materials in the dry coated sheet or other image forming system.

Furthermore, encapsulation permits the use of a liquid medium (in the capsules) in the form of a dry coating of the capsules on the sheet to give greater speed of response than that which can be obtained in solid state systems.

Also, stable free radical precursor systems which are light sensitive only in the liquid phase can be imaged as a liquid in the capsules, which have been coated, as such, in the form of a dry coating on the sheet, and the capsules then ruptured to permit the liquid medium to escape and become volatilized or adsorbed into the backing sheet. When this happens, the precursor can no longer react with the stable free radical and the sheet becomes stabilized. In this respect, it is pointed out that certain precursors, such as the phototropic oxidized lophines, will give free radicals in response to light only in a liquid medium and can be incorporated into the capsules as a solution along with the colored stable free radical. The capsule coated paper produces a bleach-out image on exposure to light. Rupture of the capsules, as aforesaid, to allow the solvent and excess precursor to escape will render the copy permanent.

Furthermore, initially light insensitive systems can be made light sensitive by rupture of capsules and again light insensitive after imaging by vaporizing or adsorbing one or more of the ingredients.

Thus, an initially light insensitive sheet can be obtained by including only the light sensitive free radical precursor or the highly colored stable free radical in the capsules and have the other ingredients contained in the coating outside the capsules. When the capsules are ruptured, the coated sheet becomes light sensitive and can be imaged. The image will become permanent on evaporation of the free radical precursor or sensitizing solution.

Dried coated sheets coated with encapsulated ingredients, as aforesaid, can be used in any of the copying processes referred to above, i.e. UV, visible light, and infrared. Furthermore, compositions made up of the aforesaid capsules, containing one or more but not all of the ingredients and suspended in a liquid carrier containing the remaining ingredients, is useful as such in those machines which utilize liquids, since such composition is insensitive to light until the capsules are ruptured.

Useful encapsulation techniques include the known NCR process, Union Carbide process, Southwest Research Institute process, IIT process, National Research Institute process, Stanford Research Institute process, National Lead process and Battelle process.

The capsule material may be selected from any of the well known inert capsule materials such as a gelatin-agar agar and other gelatin products. Since the encapsulation technique involves only well known physical phenomena, and well known encapsulating materials, it is not necessary to list large numbers of such materials or give a detailed explanation of the techniques.

The average particle size of the capsules are preferably under 100 microns, more preferably under 50 or 60 microns, for good resolution.

Examples

The following are examples of the invention:

Table I illustrates the use of different types of stable free radicals in accordance with the invention;

Table II illustrates the use of various types of light sensitive free radical precursors in accordance with the invention;

Table III illustrates the use of various promoters for the light sensitive systems;

Table IV illustrates the use of dye sensitizers for the light sensitive systems;

Table V shows the effect of binder used for the light sensitive systems; and

Table VI illustrates effect of concentration of the stable free radical.

TABLE 1

The following stable free radicals and the indicated precursors were dissolved in a 6% toluene solution of the Ethocel N–100 binder (0.5 part stable free radical and 1.0 part precursor per 100 parts binder solution) and coated onto a 45 lb. (3000 sq. ft.) bleached sulfite sheet with a No. 20 Meyer wire rod and dried. The dried coated sheets were imaged on a Bruning 110 diazo machine (ultraviolet light) at setting 2. All gave images when an Andrews 14 step silver master was used.

Example (1) α-Phenyl-α-(β-naphthyl)-β-picrylhydrazyl (stable free radical), $CHCl_3$ (precursor) and Ethocel N–100 (binder) gave a purple image or buff background.

(2) Banfield and Kenyon's radical (stable free nitroxide radical), $CHCl_3$ and Ethocel N–100 gave a dark yellow image on a light yellow background.

(3) 1,1 - dimethyl - 3 - (N - p - tolyloximino) butyl-p-tolylnitroxide, $CH_3$ and Ethocel N–100 gave a yellow image on a brown background.

(4) 1,1 - dimethyl - 3 - (N - m - tolyloximino) butyl-m-tolylnitroxide, $CHI_3$ and Ethocel N–100 gave a yellow image on a brown background.

(5) Galvinoxyl, $CHCl_3$ and Ethocel N–100 gave a yellow image on a white background.

(6) Galvinoxyl, $CHI_3$ and Ethocel N–100 gave a dark yellow image on a light yellow background.

(7) 2,6 - di - t.butyl - 4(3,5 - di - t.butyl - 4 - cyclohexa-2,5 - dienylideneamino) phenoxy, $CHCl_3$ and Ethocel N–100 gave a yellow image on a white background.

(8) Bisgalvinoxyl, $CHCl_3$ and Ethocel N–100 gave a yellow image on a white background.

(9) α,α - Diphenyl - β - picrylhydrazyl (DPPH), $CHCl_3$ and Ethocel N–100 gave a purple image on a buff background.

(9A) 0.2 g. triethyl $NH^+$ (TCNQ) (stable free radical), 1.0 g. $CHI_3$ (percursor), 1 g. anisaldehyde (promoter) and Ethocel N–22 (100 grams of 3% solution in 50–50 acetonitrile-toluene solvent) gives a green image on a buff background.

(9B) When 1.0 gram of 1,2-naphthoquinone was added to Example 9A, light response was increased substantially.

TABLE II

Using α,α-diphenyl-β-picrylhydrazyl, the following free radical precursors were used to give light sensitive copying systems. The binder used was either Ethocel N–100 or Pliolite 1131A (a styrene-butadiene resin). The stable free radical and precursor were dissolved in the toluene solution of the binder in the same proportion of stable free radical and individual precursor to binder solution used in Table I except that with Pliolite 1131A, the binder solution was a 25% solution. Where a promoter (anisaldehyde) was used, it was used in an amount equal to 1 part per 100 parts binder solution. When coated onto 45 lb. (3000 sq. ft.) bleached sulfite with a No. 20 Meyer wire rod, dried, and imaged through a Bruning 110 machine with an Andrews silver stepwedge master, the following systems gave images, purple on yellow background. The images and backgrounds were all the same colors because the same stable free radical was used.

Example

(10) $CHI_3$.
(11) Mixture of $CHI_3$ and chloranil.
(12) Mixture of $CHI_3$ and benzoquinone.
(13) Mixture of $CHI_3$ and 2,5-di-t.-butylbenzoquinone.
(14) Mixture of $CHI_3$ and 2,5-dichloro, 2,6-dihydroxybenzoquinone.
(15) Mixture of $CHI_3$ and 2,3-dichloro-1,4-naphthoquinone.
(16) Mixture of $CHI_3$ and p-diethylaminobenzaldehyde.
(17) Mixture of $CHI_3$ and 2,5 - diphenyl-p-benzophenone.
(18) Mixture of $CHI_3$ and quinhydrone.
(19) Mixture of $CHI_3$ and 1,4-naphthoquinone.
(20) Mixture of $CHI_3$ and 2-methylanthraquinone.
(21) Mixture of $CHI_3$ and anthrone.
(22) Mixture of $CHI_3$ and phenyl-p-benzoquinone.
(23) Mixture of $CHI_3$ and methyl-p-benzophenone.
(24) Mixture of $CHI_3$ and phenanthrenequinone.
(25) Mixture of $CHI_3$ and 2,5 - dichloro-p-benzoquinone.
(26) Mixture of $CHI_3$ and 2,6 - dichloro-p-benzoquinone.
(27) Mixture of $CHI_3$ and 2-methyl-1-naphthoquinone.
(28) Mixture of $CHI_3$ and 1,2-naphthoquinone.
(29) Mixture of $CHI_3$ and benz (a) anthracene-7,12-dione.
(30) Mixture of $CHI_3$ and bianthrone.
(31) Mixture of $CHI_3$ and 4,4'-bis(dimethylamine)-benzoquinone.
(32) Mixture of $CHI_3$ and tetranitromethane.
(33) Mixture of $CHI_3$ and anthrone and 1,2-naphthoquinone.
(34) $C_6H_5CHCl_2$.
(35) $CBr_4$.
(36) $CHBr_3$.
(37) $CH_2Br_2$.
(38) $CH_2I_2$.
(39) $CH_2Cl_2$.
(40) $CH_3CHBr_2$.
(41) $CH_3CHCl_2$.
(42) $CHCl_2CH_2Cl$.
(43) Dichloroacetamide.
(44) Mixture of azo bis(isobutyronitrile) (AZDN) and chloranil.
(45) Mixture of AZDN and bianthrone.
(46) Mixture of AZDN and lophine.
(47) Mixture of AZDN and 2,2'-dimethylthiocarbanilide.
(48) Mixture of AZDN and N,N'-diethyl-p-nitrosoaniline.
(49) Mixture of AZDN and 4,4'-bis(dimethylamino)-benzophenone.
(50) Mixture of Lucidol R–300 and 1,2-naphthoquinone and anthrone and anisaldehyde.
(51) Mixture of Lucidol D–800 and 1,2-naphthoquinone and anthrone and anisaldehyde.
(52) Mixture of National Polychemical NP–1 (Functional group N—NO) and anisaldehyde.
(53) Mixture of National Polychemical NP–2 (Functional group R—$N_3$) and anisaldehyde.
(54) Mixture of National Polychemical NP–3 (Functional group —$SO_2N_2H_3$) and anisaldehyde.
(55) Mixture of National Polychemical NP–4 (Functional group —$SO_2N_2H_3$) and anisaldehyde.
(56) Mixture of National Polychemical NP–5 (Functional group —N=N—) and anisaldehyde.
(57) Mixture of National Polychemical NP–6 (Functional group —N=N—) and anisaldehyde.
(58) Mixture of National Polychemical NP–7 (Functional group N—NO) and anisaldehyde.
(59) Mixture of National Polychemical NP–8 (Functional group —N=N—) and anisaldehyde.
(60) Bianthrone.
(61) Mixture of tetranitromethane and cinnamaldehyde.
(62) Mixture of tetranitromethane and furaldehyde.
(63) Mixture of tetranitromethane and methylcinnamaldehyde.
(64) Mixture of tetranitromethane and phorone.
(65) Mixture of tetranitromethane and isophorone.
(66) Mixture of tetranitromethane and acrylamide.
(67) Mixture of tetranitromethane and methacrylamide.
(68) Mixture of tetranitromethane and laurylmethacrylate.
(69) Mixture of tetranitromethane and nicotinamide.
(70) Mixture of tetranitromethane and itaconic acid.
(71) Mixture of tetranitromethane and dehydroacetic acid.
(72) Mixture of tetranitromethane and 2-furoic acid.
(73) Mixture of tetranitromethane and bispentachlorocyclopendienyl.
(74) Mixture of tetranitromethane and maleic acid.
(75) Mixture of tetranitromethane and 6-diethylcarbamoyl-3-cyclohexene-1-carboxylic acid.
(76) Mixture of tetranitromethane and bis-4-cyclohexene-1,3-dicarboxylic acid.
(77) Mixture of tetranitromethane and itaconic acid anhydride.
(78) Mixture of tetranitromethane and diphenyl formamidine.
(79) Mixture of Lucidol D–800 and anisaldehyde.
(80) Mixture of azobis (isobutyronitrile) and anisaldehyde.
(81) Mixture of Lucidol R–300 and anisaldehyde.
(82) Mixture of anthrone and anisaldehyde.
(83) Mixture of phenanthrene quinone and anisaldehyde.
(84) Mixture of 1,2-naphthoquinone and anisaldehyde.
(85) Mixture of chloranil and anisaldehyde.
(86) Mixture of o-chloranil and anisaldehyde.
(87) Mixture of 4,4'-bisdimethylaminobenzophenone and anisaldehyde.
(87A) Mixture of triallyloxyvinylsilane and diazald.
(87B) Polyvinylpyrrolidone-iodine complex.

TABLE III

It has been found that various substituted aromatic aldehydes and ketones will increase the sensitivity of this system to thereby act as promoters. The aldehydes and ketones alone with the stable free radicals do not give an image. The following examples show an improvement of sensitivity by addition of aldehyde or ketone promoters.

α,α-diphenyl-β-picrylhydrazyl (DPPH) was dissolved in a toluene solution of ethocel N–100 or Pliolite 1131A, along with the following precursors and promoters (the ratios were the same as in Table II) and was coated on 45 lbs. (3000 sq. ft.) bleached sulfite paper with a No. 20 Meyer wire rod. The sensitivities were all determined on the Bruning 110 machine with an Andrews silver step wedge master.

Example

(88) Bianthrone, anisaldehyde.
(89) Anthrone, anisaldehyde.
(90) Chloranil, anisaldehyde.
(91) Phenanthrenequinone, anisaldehyde.
(92) 4,4'-bis dimethylaminobenzophenone, anisaldehyde.
(93) 1,2-naphthoquinone, anisaldehyde.
(94) o-Chloranil, anisaldehyde.
(95) Azobis (isobutyronitrile), anisaldehyde.
(96) $CHI_3$, anisaldehyde.
(97) $CHI_3$, 1-naphthaldehyde.
(98) $CHI_3$, o-methoxybenzaldehyde.
(99) $CHI_3$, p-tolualdehyde.
(100) $CHI_3$, 3-ethoxy-4-hydroxybenzaldehyde.
(101) $CHI_3$ 2,3-dimethoxybenzaldehyde.
(102) $CHI_3$, 2,4-dimethoxybenzaldehyde.
(103) $CHI_3$, 2,5-dimethoxybenzaldehyde.
(104) $CHI_3$, 3,4,5-trimethoxybenzaldehyde.
(105) $CHI_3$, 3,3',4,4',5-pentamethoxybenzophenone.

photographic coating. This is a common measure used in diazo and silver halide photographic systems.

| Ex. | Dye | 60 sec. | 30 sec. | 10 sec. | 5 sec. |
|---|---|---|---|---|---|
| (106) | No dye | 14+ | 14+++ | 14+++++ | Trace. |
| (107) | Patent blue | 12 | 14++ | 14++++ | 14++++++ |
| (108) | Thioflavine T | 14 | 14++ | 14+++++ | Trace. |
| (109) | Brilliant green | 13 | 14++ | 14++++ | 14++++++ |

The following were exposed on the Bruning 110 with an Andrews silver step wedge at machine settings 2, 4, 6, 8, and 10.

| Ex. | Dye | Setting | | | | |
|---|---|---|---|---|---|---|
| | | 2 | 4 | 6 | 8 | 10 |
| (110) | No dye | 9 | 10 | 11 | 13 | 14 |
| (111) | Bromphenol blue | 8– | 9 | 10– | 10 | 11 |
| (112) | Dibromofluorescein | 8 | 9+ | 10 | 11– | 12– |

The lower the wedge number, the more sensitive the coating.

TABLE V

The binders act to bind the ingredients together and to the supporting sheet and also act as a reaction media for the imaging process. Different binders have different speed of response. In the following, toluene solutions of various resins were made with 100 g. resin solution, 0.1 g. DPPH, 0.1 g., benzophenone, 0.5 g., anisaldehyde, and 1.0 g., precursor. These were coated in the normal manner and exposed to an Andrews step wedge master on the Bruning 110 machine at different settings.

| Ex. | Iodoform precursor with— | Settings | | | | |
|---|---|---|---|---|---|---|
| | | 2 | 4 | 6 | 8 | 10 |
| (113) | Ethocel N–100 | 11– | 12– | 14+ | 14+ | 14++ |
| (114) | Styron 666–27 | 12– | 14+ | 14+ | 14++ | 14+++ |
| (115) | Pliolite 1131A | 11 | 13 | 14+ | 14+ | 14++ |
| (116) | Ethylhydroxyethylcellulose | 10+ | 11 | 13 | 14+ | 14++ |

| Ex. | Anthrone precursor with— | Settings | | | | |
|---|---|---|---|---|---|---|
| | | 2 | 4 | 6 | 8 | 10 |
| (117) | Ethocel N–100 | 7 | 13 | 14 | 14 | 14 |
| (118) | Styron 666–27 | 14+ | 14++ | 14+++ | 14++++ | 14+++++ |
| (119) | Ethylhydroxyethylcellulose | 14+ | 14++ | 14++ | 14+++ | 14+++ |
| (120) | Pliolite 1131A | 14+ | 14++ | 14+++ | 14+++ | 14+++ |

TABLE IV

It has been found that dyes can be used to sensitize the light sensitive systems of the invention. This is illustrated in the following table. The basic coatings formula contains 100 g. 30% Pliolite 1131A, 1 g. bianthrone (precursor), 1 g. anisaldehyde (promoter), 0.2 g. DPPH, 0.2 g. benzophenone (promoter), and 10 drops of a 1% solution of various dyes. The coatings were applied in the normal manner and the dried sheets were exposed to an Andrews step wedge master to a contact printer using visible light (travelgraph model 21000 projector). The exposure times are indicated at the heads of the columns.

The numbers under these headings refer to the last step wedge visible on the copy. The plus signs indicate the amount of background, and the word trace indicates the image is barely visible through a heavy background. The lower the wedge number, the more sensitive the Any of the well known binders conventionally used in coatings can be used, including the vinyl resins, so long as it is inert to the other components of the coating.

TABLE VI

This shows how little stable free radical is required to provide an excellent bleach-out image. The basic formula is 100 g. of a 25% polyester (sold under the name PE 200/207 by Goodyear Tire & Rubber Company) solution containing 1 g. anisaldehyde, 0.25 g. 1,2-naphthoquinone precursor, 0.2 g. benzophenone and 5 drops 1% bromphenol blue with varying amounts of the stable free radical DPPH. The coating was applied in the normal manner and the dried sheets were exposed through an Andrews silver step wedge at various settings on the Bruning machine. The numbers under the columns give the number of steps visible on the print.

| Example | Grams DPPH per 100 g. binder solution | Settings | | | | |
|---|---|---|---|---|---|---|
| | | 2 | 4 | 6 | 8 | 10 |
| (121) | 0.6 | 14+++ | 14++++ | 14++++ | 14+++++ | 14+++++ |
| (122) | 014 | 14++ | 14+++ | 14+++ | 14+++ | 14+++ |
| (123) | 0.2 | 10 | 11+ | 13– | 14+ | 14+ |
| (124) | 0.1 | 8 | 9 | 10 | 11 | 12– |
| (125) | 0.05 | 6 | 7 | 8+ | 9 | 10 |
| (126) | 0.025 | 4 | 5 | 6 | 7 | 8+ |
| (127) | 0.012 | 1 | 1 | 1 | 2 | 4 |
| (128) | 0.006 | 0 | 0 | 0 | 0 | 0 |

Although sensitivity increased with decrease in stable free radical concentration, nevertheless when the concentration was reduced below 0.05 gram, the image density commenced to decrease.

TABLE VII

These examples show that the photosensitive compositions of the invention will give excellent images on a Thermofax copier with the use of various colored masters but yet are heat insensitive whereas conventional thermocopy papers are color blind and will record only infrared absorbing images, and remain heat senstive after copying.

(129) Infra red copies on the Thermofax secretary copier were obtained with yellow, magenta, orange, red, green, brown, and dark brown master image transparencies when directly exposed on sheets containing DPPH, 1,2-naphthoquinone, and anisaldehyde in a polyester PE 200/207 binder mixture. The image was purple on a yellow background.

(130) Infra red copies on the Thermofax secretary copier were obtained with yellow, magenta, orange, red, green, brown and dark brown master image transparencies when directly exposed on sheets containing DPPH, 1,2-naphthoquinone, and anisaldehyde with Ethocel N–100 as the binder.

(131) Similar infra red copies were obtained using DPPH, phenanthrene-quinone, and anisaldehyde in Polyester PE 200/207 binder mixture.

(132) Similar results to 131 were obtained using bianthrone as the free radical precursor.

Examples of encapsulated reactants

A toluene solution of tetranitromethane (precursor) cinnamaldehyde, and $\alpha,\alpha$-diphenyl-$\beta$-picrylhydrazyl (stable free radical) was encapsulated in a gelatin-agar agar capsule according to the known NCR process. The solution contained 1 part stable free radical, one part precursor and one part cinnamaldehyde per 100 parts of toluene. The tetranitromethane is a difficult material to work with due to its explosive nature and its high volatility. These capsules were approximately 10–25 microns in diameter and were suspended in a 6% Ethocel N–100 solution in toluene in a proportion of 100 grams of encapsulated material to 50 parts of the Ethocel binder solution. The suspension was coated evenly onto a paper base and dried. The coated paper was exposed to UV in a Bruning 110 copying machine to bleach out the highly colored stable free radical $\alpha,\alpha$-diphenyl-$\beta$-picryl hydrazyl in the light struck areas. The capsules were then ruptured by passing them through a pair of pressure rolls to permit the volatile tetranitromethane to escape. A purple stable image on a yellow background was obtained.

The aforesaid example was repeated except that chloroform and anisaldehyde were substituted for the tetranitromethane and cinnamaldehyde. The same results were achieved.

The example of the preceding paragraph was repeated except that the stable free radical was incorporated in the binder solution outside the capsules instead of being included inside the capsules with the precursor and except that the capsules were ruptured just before imaging. The imaging results were the same but the coated sheet before imaging was light insensitive.

Any inert solvent carrier can be used for the stable free radicals, precursors and promoters, when one is used. Examples are the aliphatic and aromatic hydrocarbons, such as toluene and benzene; alcohols, such as methanol; ketones, such as methyl ethyl ketone; esters, such as methyl acetate; etc. However, it is desirable that it be readily volatile so that when the composition has been applied to the backing sheet, it can be easily dried.

Sufficient stable free radical should be used to provide a good color density. This can be readily ascertained by visual observation.

Sufficient precursor should be present to furnish enough transient free radicals to bleach out the stable free radicals in the light struck areas. This also can be readily determined by visual observation. The optimum amount will vary for each stable free radical and each precursor. Each of the stable free radicals has a different degree of stearic hinderance around the unpaired electron and the rate of reaction of such electron will vary according to the magnitude of the stearic hindrance. Also, the free radicals generated from different precursors vary in reactivity because they have different sizes also and because they differ in their lifetimes. The larger sizes and the shorter lifetimes result in greater difficulty in reacting with the unpaired electrons of the stable free radical. The more difficult the reaction, the greater amount of precursor is required.

I claim:

1. A light sensitive copy sheet comprising a backing sheet coated with a light sensitive composition consisting essentially of an organic colored stable free radical, which is stable and can be isolated and stored under normal conditions for long periods of time, and a precursor sensitive to light to convert it to transient free radicals which are unstable and exist only for a fraction of a second to a few seconds and which are reactive with said stable free radical to bleach out the color thereof.

2. A sheet according to claim 1, said stable free radical being selected from the group consisting of organic hydrazyls, organic verdazyls, pyridinal compounds, organic nitroxides, organic aroxyls, aryl alkyls and aryl cycloalkyls in which the unpaired electron is on a carbon atom in the alkyl or cycloalkyl group and stable ion free radicals selected from the group consisting of Wurster radicals, Weitz's radicals, semiquinones, salts of polycyanoquinone dimethane and polycyanonaphthoquinone dimethane, ion radicals formed by reaction of polynuclear and heterocyclic compounds with an alkali metal, polynuclear and heterocyclic chlorates, unsubstituted and N-alkyl substituted carbozole-$C_7H_7^+BF_4^-$, triaryl nitrogen free radicals and hydrazinylium free radicals, Koelsch's radical, tanone, polyalkylthiobenzene-$SbCl5$, N,N'-dihydro-1,4-diazine cation, cation radical from tetra kis (dimethylamino) ethylene, stable free ion radicals from hexaalkylradialene, diphenylacetylene, dibenzocyclobutadiene, cycloheptafluorene, tetraphenylallyl, bipyrimidine, nitrobenzophenols, dinitrobenzyl, transtilbene, ninhydrin and alloxan.

3. A sheet according to claim 2, said precursor being selected from the group consisting of nitroaliphatics, paratertiary-amino aromatics, highly halogenated aliphatic, alicyclic and aromatic hydrocarbons, quinones, azo compounds, aromatic disulfides, organic silanes, halo-amides and imides, the halogens in the form of stable solid complexes, organic N-nitroso compounds, aromatic sulphon hydrazides and phototropic free radical precursors of the group selected from anthrones, tertiary amino triaryl methanes, oxidized lophines, aromatic ketones, and the anilides formed by reaction of aromatic aldehydes and aromatic amines.

4. A sheet according to claim 1, said composition also including a promoter for promoting the generation of said transient free radicals in response to light and selected from the group consisting of aromatic aldehydes and ether substituted aromatic ketones.

5. A sheet according to claim 1, said composition including an organic binder.

6. A sheet according to claim 1, at least one of said stable free radical and said precusor being encapsulated in rupturable, micro capsules distributed throughout and forming at least a part of said coating, said coating containing a binder to bind said capsules together and to the backing sheet.

7. A sheet according to claim 6, both said stable free radical and said precusor being encapsulated together in said capsules.

8. A sheet according to claim 6, only one of said stable free radical and said precursor being encapsulated in said capsules, the other being incorporated in the coating outside said capsules.

9. A sheet according to claim 6, said encapsulated ingredient being dissolved in a volatile organic solvent in the capsules.

10. A sheet according to claim 6, said precursor being highly volatile and being present in said capsules.

11. A light sensitive copy sheet comprising a backing sheet coated with a light sensitive composition consisting essentially of an organic colored stable free radical which is stable and can be isolated and stored under normal conditions for long periods of time, and a precursor sensitive to light to convert it to transient free radicals which are unstable and exist only for a fraction of a second to a few seconds and which are reactive with said stable free radical.

12. A liquid composition for coating backing sheets to provide light sensitive copy sheets consisting essentially of a solution in a volatile organic solvent of a colored stable free radical, which is stable and can be isolated and stored under normal conditions for long periods of time, and a precursor sensitive to light to convert it to transient free radicals, which are unstable and exist only for a fraction of a second to a few seconds and which are reactive with said stable free radical to bleach out the color thereof.

13. A liquid composition according to claim 12, said stable free radical being selected from the group consisting of organic hydrazyls, organic verdazyls, pyridinal compounds, organic nitroxides, organic aroxyls, aryl alkyls and aryl cycloalkyls in which the unpaired electron is on a carbon atom in the alkyl or cycloalkyl group and stable ion free radicals selected from the group consisting of Wurster radicals, Weitz's radicals, semiquinones, salts of polycyanoquinone dimethane and polycyanonaphthoquinone dimethane, ion radicals formed by reaction of polynuclear and heterocyclic compounds with an alkali metal, polynuclear and heterocyclic chlorates, unsubstituted and N-alkyl substituted carbozole-$C_7H_7{}^+BF_4{}^-$, triaryl nitrogen free radicals and hydrazinylium free radicals, Koelsch's radical, tanone, polyalkylthiobenzene-$SbCl_5$, N,N'-dihydro-1, 4-diazine cation, cation radical from tetra kis (dimethylamino) ethylene, stable free ion radicals from hexaalkylradialene, diphenylacetylene, dibenzocyclobutadiene, cycloheptafluorene, tetraphenylallyl, bipyrimidine, nitrobenzophenols, dinitrobenzyl, transtilbene, ninhydrin and alloxan.

14. A composition according to claim 13, said precursor being selected from the group consisting of nitroaliphatics, para-tertiary-amino aromatics, highly halogenated aliphatics, alicyclic and aromatic hydrocarbons, quinones, azo compounds, aromatic disulfides, organic silanes, haloamides and imides, the halogens in the form of stable solid complexes, organic N-nitroso compounds, aromatic sulphon hydrazides, and phototropic free radical precursors of the group selected from anthrones, tertiary amino triaryl methanes, oxidized lophines, aromatic ketones, and the analides formed by reaction of aromatic aldehydes and aromatic amines.

15. A liquid composition according to claim 12, said composition also including a promoter for promoting the generation of said transient free radicals in response to light and selected from the group consisting of aromatic aldehydes and ether substituted aromatic ketones.

16. A liquid composition according to claim 12 also including an organic binder.

17. A composition according to claim 7, at least one of said stable free radical and said precursor being encapsulated in rupturable micro capsules, said solvent containing a binder, said capsules being suspended in the solvent-binder system.

18. A composition according to claim 17. both said stable free radical and said precursor being encapsulated together in said capsules.

19. A composition according to claim 17, only one of said stable free radical and said precursor being encapsulated in said capsules, the other being present in the composition outside said capsules.

20. A composition according to claim 17, said encapsulated ingredient being dissolved in a volatile organic solvent in the capsules.

21. A liquid composition for coating backing sheets to provide light sensitive copy sheets consisting essentially of a solution in a volatile organic solvent of a colored stable free radical which is stable and can be isolated and stored under normal conditions for long periods of time, and a precursor sensitive to light to convert it to transient free radicals which are unstable and exist only for a fraction of a second to a few seconds and which are reactive with said stable free radical.

22. A method of imaging a copy sheet from a master comprising imaging said copy sheet by a source of light selected from the group consisting of ultra-violet light, infra red light and visible light, said copy sheet having coated thereon a composition consisting essentially of a colored stable free radical which is stable and can be isolated and stored under normal conditions for long periods of time, and a precursor sensitive to light to convert it to transient free radicals which are unstable and exist only for a fraction of a second to a few seconds and which are reactive with said stable free radical at the light struck areas of said copy sheet corresponding to the non image areas of said master, leaving unreacted the colored stable free radical corresponding to the image areas of said master, and removing excess precursor from said copy sheet to stabilize the image.

23. A method of imaging a copy sheet from a master comprising imaging said copy sheet by a source of light selected from the group consisting of ultra-violet light, infra red light and visible light, said copy sheet having coated thereon a composition consisting essentially of a colored stable free radical, which is stable and can be isolated and stored under normal conditions for long periods of time, and a precursor sensitive to light to convert it to transient free radicals which are unstable and exist only for a fraction of a second to a few seconds and which are reactive with said stable free radical to bleach out the color thereof, said exposure to said source of light bleaching out the light struck areas of said copy sheet, corresponding to the non-image areas of said master, leaving unbleached the colored stable free radical corresponding to the image areas of said master and removing excess precursor from said copy sheet to stabilize the image.

24. A method according to claim 23, at least one of said stable free radicals and said precursor being encapsulated in micro capsules forming at least part of said coating, said method including rupturing said capsules.

25. A method according to claim 24, said capsules being ruptured just prior to said exposure.

26. A method according to claim 24, said capsules being ruptured at the time of said exposure.

27. A method according to claim 24, said capsules being ruptured after said exposure.

(References on following page)

References Cited

UNITED STATES PATENTS

| | | | |
|---|---|---|---|
| 3,046,209 | 7/1962 | Sprague | 96—90 |
| 3,112,200 | 11/1963 | Waines | 96—90 |

FOREIGN PATENTS

| | | | |
|---|---|---|---|
| 799,479 | 8/1958 | Great Britian | 96—89 |
| 1,010,561 | 11/1965 | Great Britian | 96—89 |
| 723,122 | 12/1965 | Canada | 96—89 |

OTHER REFERENCES

Hung, "Stable Radical Ions," Chemical and Engineering News, Oct. 3, 1966, pp. 102–103.

GEORGE F. LESMES, Primary Examiner

J. P. BRAMMER, Assistant Examiner

U.S. Cl. X.R.

96—27, 67, 90; 250—65; 204—158